(12) United States Patent
Bennett et al.

(10) Patent No.: US 7,716,949 B2
(45) Date of Patent: May 18, 2010

(54) METHOD FOR POSITIONING GLASS SHEETS FOR FORMING

(75) Inventors: Terry A. Bennett, Northwood, OH (US); Steven M. Connell, Bowling Green, OH (US)

(73) Assignee: Glasstech, Inc., Perrysburg, OH (US)

( * ) Notice: Subject to any disclaimer, the term of this patent is extended or adjusted under 35 U.S.C. 154(b) by 350 days.

(21) Appl. No.: 11/696,209

(22) Filed: Apr. 4, 2007

(65) Prior Publication Data
US 2008/0245107 A1  Oct. 9, 2008

(51) Int. Cl.
- *C03B 11/00* (2006.01)
- *C03B 11/05* (2006.01)
- *C03B 23/00* (2006.01)
- *C03B 23/023* (2006.01)
- *C03B 23/03* (2006.01)

(52) U.S. Cl. .................. 65/29.12; 65/29.18; 65/106; 65/158; 65/160; 65/323

(58) Field of Classification Search .................. 65/29.1, 65/29.11, 29.12, 29.14, 29.18, 106, 107, 65/158, 160, 163, 323
See application file for complete search history.

(56) References Cited

U.S. PATENT DOCUMENTS

| | | | |
|---|---|---|---|
| 3,573,889 A * | 4/1971 | McMaster et al. ............. 65/62 |
| 3,806,312 A | 4/1974 | McMaster et al. |
| 3,936,291 A | 2/1976 | McMaster |
| 3,947,242 A | 3/1976 | McMaster et al. |
| 3,992,182 A * | 11/1976 | Frank ........................ 65/163 |
| 3,994,711 A | 11/1976 | McMaster |
| 4,204,854 A | 5/1980 | McMaster et al. |
| 4,222,763 A | 9/1980 | McMaster |
| 4,282,026 A | 8/1981 | McMaster et al. |
| 4,364,766 A * | 12/1982 | Nitschke ...................... 65/160 |
| 4,404,011 A | 9/1983 | McMaster |
| 4,437,871 A * | 3/1984 | McMaster et al. ............. 65/104 |
| 4,470,838 A | 9/1984 | McMaster et al. |
| 4,512,460 A | 4/1985 | McMaster |
| 4,525,193 A | 6/1985 | McMaster et al. |
| 4,575,390 A | 3/1986 | McMaster |
| 4,661,141 A | 4/1987 | Nitschke et al. |
| 4,662,925 A | 5/1987 | Thimons et al. |
| 4,666,493 A * | 5/1987 | Frank et al. ................. 65/29.12 |
| 4,793,466 A | 12/1988 | Petitcollin et al. |
| 4,825,376 A | 4/1989 | Brinker et al. |
| 4,946,491 A | 8/1990 | Barr |
| 5,004,491 A | 4/1991 | McMaster et al. |
| 5,147,439 A | 9/1992 | Ritz |
| 5,226,942 A * | 7/1993 | Letemps et al. ............... 65/106 |
| 5,330,550 A | 7/1994 | Kuster et al. |
| 5,376,158 A | 12/1994 | Shetterly et al. |
| 5,385,786 A | 1/1995 | Shetterly et al. |
| 5,472,470 A | 12/1995 | Kormanyos et al. |
| 5,900,034 A | 5/1999 | Mumford et al. |
| 5,906,668 A | 5/1999 | Mumford et al. |
| 5,917,107 A | 6/1999 | Ducat et al. |

(Continued)

*Primary Examiner*—Khanh Nguyen
*Assistant Examiner*—Carson Gross
(74) *Attorney, Agent, or Firm*—Brooks Kushman P.C.

(57) ABSTRACT

A method having particular utility for making outer and inner formed windshield glass sheets is performed by glass sheet positioning centrally on a forming face (34) of a forming mold (32) to form each glass sheet to a design shape regardless of any size difference between the glass sheets from one cycle to the next.

8 Claims, 3 Drawing Sheets

U.S. PATENT DOCUMENTS

| | | |
|---|---|---|
| 5,925,162 A | 7/1999 | Nitschke et al. |
| 6,032,491 A | 3/2000 | Nitschke et al. |
| 6,079,094 A | 6/2000 | Ducat et al. |
| 6,173,587 B1 | 1/2001 | Mumford et al. |
| 6,227,008 B1 | 5/2001 | Shetterly et al. |
| 6,418,754 B1 | 7/2002 | Nitschke et al. |
| 6,513,348 B2 | 2/2003 | Shetterly et al. |
| 6,543,255 B2 | 4/2003 | Bennett et al. |
| 6,578,383 B2 | 6/2003 | Bennett et al. |
| 6,718,798 B2 | 4/2004 | Nitschke et al. |
| 6,729,160 B1 | 5/2004 | Nitschke et al. |
| 2006/0021385 A1 | 2/2006 | Cimo et al. |

* cited by examiner

METHOD FOR POSITIONING GLASS SHEETS FOR FORMING

BACKGROUND OF THE INVENTION

1. Field of the Invention

This invention relates to a method for positioning glass sheets for forming.

2. Background Art

Glass sheets are conventionally formed by heating on a conveyor within a furnace and then forming prior to delivery for cooling. Such cooling can be slow cooling to provide annealing or faster cooling that provides heat strengthening or tempering. In connection with heating of the glass sheets, see U.S. Pat. Nos. 3,806,312 McMaster et al.; 3,947,242 McMaster et al.; 3,994,711 McMaster; 4,404,011 McMaster; and 4,512,460 McMaster. In connection with glass sheet forming, see U.S. Pat. Nos. 4,204,854 McMaster et al.; 4,222,763 McMaster; 4,282,026 McMaster et al.; 4,437,871 McMaster et al.; 4,575,390 McMaster; 4,661,141 Nitschke et al.; 4,662,925 Thimons et al.; 5,004,491 McMaster et al.; 5,330,550 Kuster et al.; 5,376,158 Shetterly et al.; 5,472,470 Kormanyos et al.; 5,900,034 Mumford et al.; 5,906,668 Mumford et al.; 5,925,162 Nitschke et al.; 6,032,491 Nitschke et al.; 6,173,587 Mumford et al.; 6,227,008 Shetterly; 6,418,754 Nitschke et al.; 6,543,255 Bennett et al.; 6,578,383 Bennett et al.; 6,718,798 Nitschke et al.; 6,729,160 Nitschke et al. In connection with the cooling, see U.S. Pat. Nos. 3,936,291 McMaster; 4,470,838 McMaster et al.; 4,525,193 McMaster et al.; 4,946,491 Barr; 5,385,786 Shetterly et al.; 5,917,107 Ducat et al.; 6,079,094 Ducat et al.; and 6,513,348 Bennett et al.

Vehicle windshields are conventionally manufactured from outer and inner formed glass sheets and an intermediate layer of polyvinyl butyral. The outer and inner glass sheets have different sizes since the outwardly curved shape of the formed windshield necessitates that the outer glass sheet be slightly greater in size than the inner glass sheet. Also, upon manufacturing, there can be slight variations in the size of flat glass prior to the forming. Thus, switches which have previously been utilized to sense the approach of a glass sheet to initiate transfer from a conveyor for forming do not necessarily initiate transfer that positions the glass centrally on a forming mold for the forming.

SUMMARY OF THE INVENTION

An object of the present invention is to provide an improved method for positioning a heated glass sheet for forming.

In carrying out the above object, the method for positioning a heated glass sheet for forming is performed by conveying a heated glass sheet on a horizontal conveyor in a horizontally plane of conveyance along a direction of conveyance toward a forming station having a forming mold including a downwardly facing curved forming face that is positioned above the plane of conveyance and has a forming portion for forming a glass sheet of a predetermined size. The spacing along the direction of conveyance between downstream and upstream extremities of the conveyed glass sheet is detected to determine any difference from the glass sheet of the predetermined size and a control signal is generated to indicate any such difference. The conveyance of the glass sheet is continued below the forming mold and the control signal is used to centrally position the glass sheet along the direction of conveyance below the forming portion of the forming face. The centrally positioned glass sheet is transferred from the conveyor to the forming mold for forming of the glass sheet against the forming face.

The downstream extremity of the conveyed glass sheet is preferably initially detected by a detector and the upstream extremity of the conveyed glass sheet is subsequently detected by the detector in coordination with the conveyance to generate the control signal, and the conveyance of the glass sheet is coordinated with the control signal to provide the central positioning of the glass sheet along the direction of conveyance below the forming portion of the forming face. More specifically, the subsequent detection of the upstream extremity of the conveyed glass sheet generates the control signal which is coordinated with the conveyance to provide the central positioning of the glass sheet for the transfer from the conveyor to the mold forming face. Also, the conveyance of the glass sheet is decelerated upon approaching the central position below the mold forming face and is transferred to the forming face at the central position while still moving.

The glass sheet positioning method as disclosed is used to alternately convey and position vehicle windshield outer and inner glass sheets for the forming with the outer glass sheets having a slightly greater distance between their downstream and upstream extremities than the inner glass sheets.

Furthermore, the centrally positioned glass sheet is transferred from the conveyor to the forming mold by any step including: lifting the glass sheet upwardly from the conveyor by a continuous ring; lifting the glass sheet upwardly from the conveyor by a segmented ring; drawing a vacuum at the curved forming face of the forming mold; moving the forming mold downwardly toward the conveyor; blowing gas upwardly from below the glass sheet to lift the glass sheet upwardly from the conveyor; and any combination of two or more of these steps.

Also, the glass sheet is laterally located prior to heating and subsequent conveyance to the forming station.

The objects, features and advantages of the present invention are readily apparent from the following detailed description of the preferred embodiments when taken in connection with the accompanying drawings.

DETAILED DESCRIPTION OF THE PREFERRED EMBODIMENTS

Figure 1:
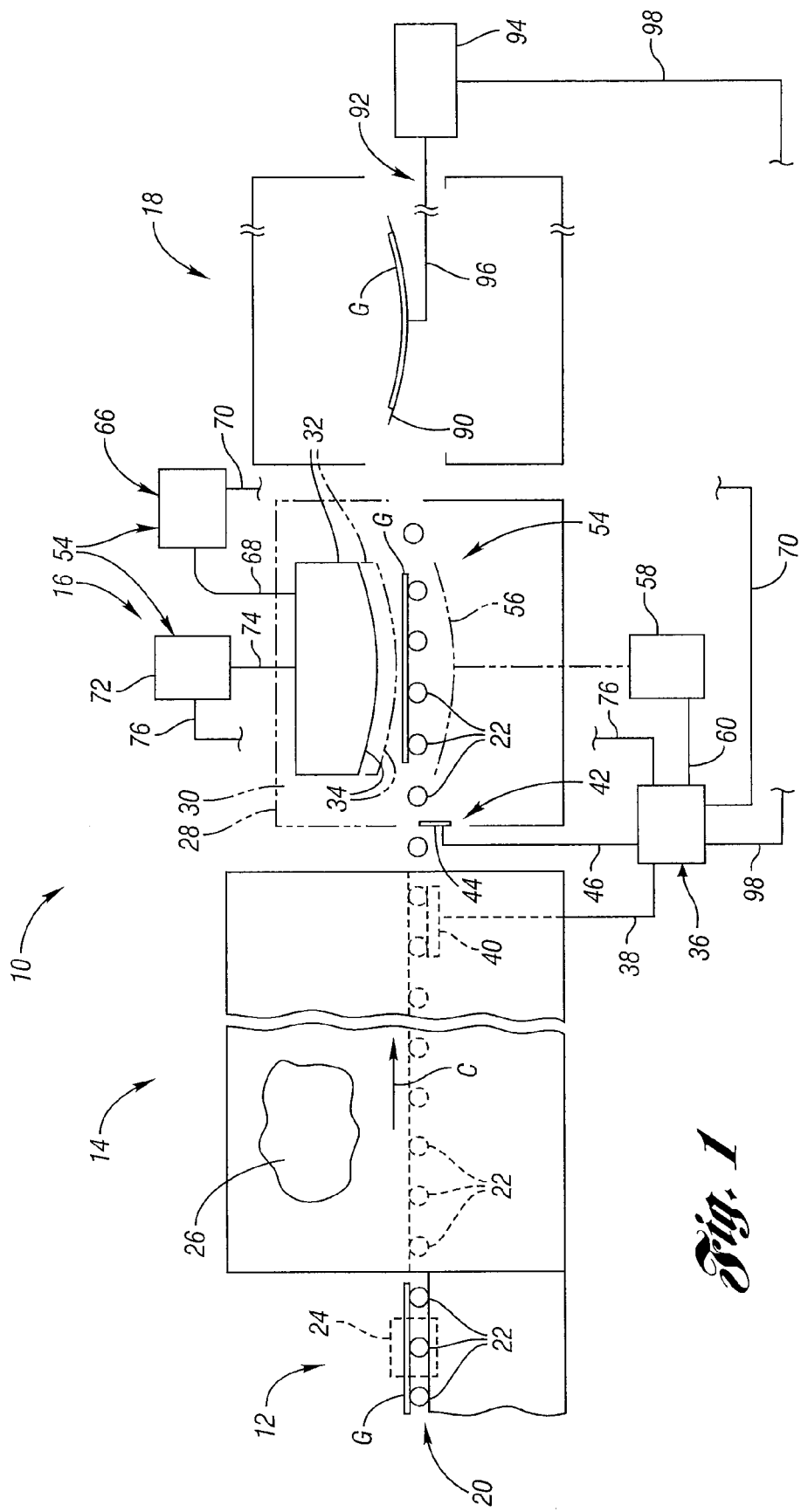
FIG. 1 is a side elevational view of a glass sheet forming system that performs a method for positioning glass sheets in accordance with the invention.

With reference to FIG. 1, a glass sheet forming system is generally indicated by 10 and includes a loading station 12 for loading glass sheets G, a furnace 14 for heating the glass sheets, a forming station 16 for forming the glass sheets, and a quench station 18 for cooling the glass sheets for slow cooling to provide annealing although it is also possible to provide faster cooling for tempering or heat strengthening when required by the application of the particular type of glass sheet being processed.

With continuing reference to FIG. 1, a conveyor 20 of the forming system is illustrated as being of the roll type including rolls 22 that convey the glass sheets for heating in the furnace 24 and for movement into the forming station 26 for the forming. The conveyor rolls 22 support each glass sheet G in a horizontal plane of conveyance for movement along a direction of conveyance as shown by arrow C. It is also possible to convey the glass sheets on other types of conveyors, such as on air hearth conveyors in which case the horizontal plane of conveyance normally will be slightly tilted in a lateral direction transverse to the direction of conveyance.

At the loading station 12 each glass sheet is loaded either manually or by automated apparatus such as one or more robots for conveyance on the rolls 22 of conveyor 20. A lateral positioner 24 of the loading station laterally positions each loaded glass sheet G with respect to the direction of conveyance so as to be in the proper location upon ultimately reaching the forming station 16 after passage through a heating chamber 26 of the furnace 14 for heating to a forming temperature in any conventional manner.

Figure 3A:
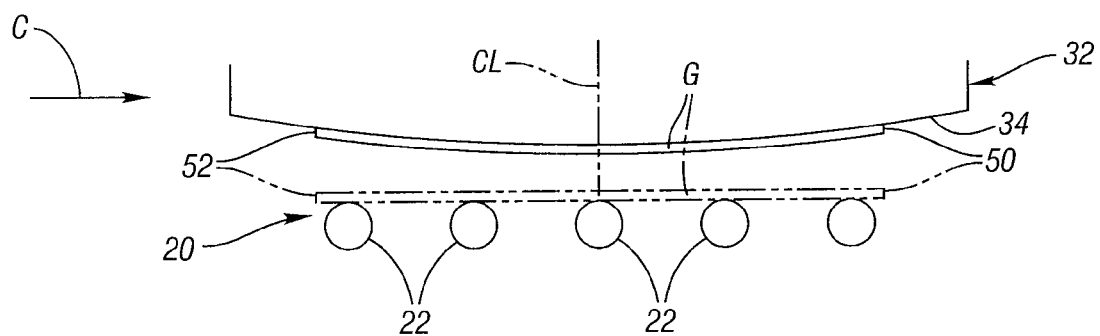
FIGS. 3a and 3b respectively illustrate the manner in which larger and smaller glass sheets are centrally positioned on a forming face of a curved forming mold to provide forming to a design shape.
Figure 3B:
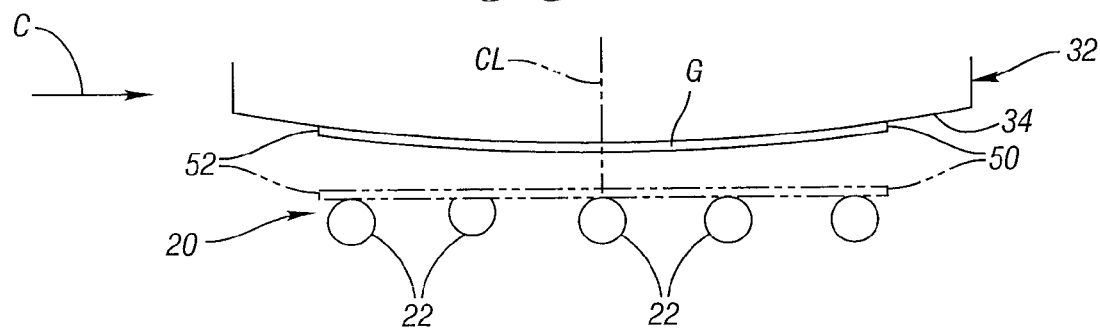

The forming station 16 as shown in FIG. 1 includes a housing 28 that defines a heating chamber 30 in which a forming mold 32 is located. This heated chamber 30 as disclosed is not as hot as the heating chamber 26 of furnace 14, more specifically, the furnace heating chamber will normally be on the order of 600-680° C. in different locations, while the heating chamber 30 where the forming mold 32 is located will be about 500° C. The forming mold 32 is located above the rolls 22 of the conveyor 20 and has a downwardly oriented forming face 34 of a curved shape. This forming face has a forming portion for forming a glass sheet of a predetermined size. More specifically, as shown in FIGS. 3a and 3b, the forming portion of forming face 34 has a central location CL along the direction of conveyance C. A glass sheet of the predetermined size when centrally positioned on the conveyor, or on the forming face 34 as is hereinafter described, will have the midpoint between its downstream and upstream extremities along the direction of conveyance located at the forming face central location CL.

A controller 36 of the forming system through a connection 38 operates a schematically indicated drive 40 of the conveyor 20. Furthermore, a detection system 42 of the system includes a detector 44 located upstream from the forming mold 32 and having a connection 46 to the controller 36.

Figure 2A:
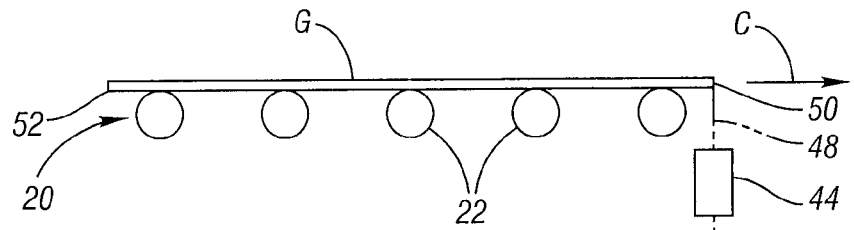
FIGS. 2a and 2b illustrate a detector of a detection system for respectively detecting downstream and upstream extremities of a conveyed glass sheet in preparation for forming.
Figure 2B:
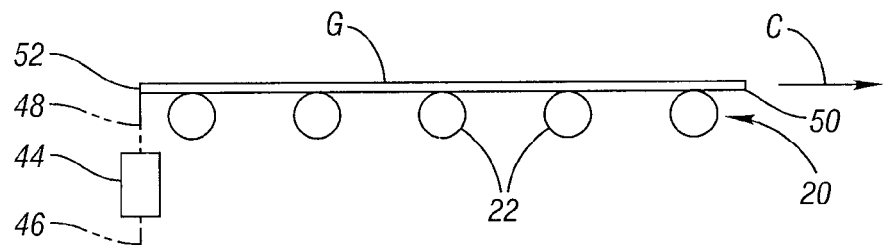

As shown in FIG. 2a, the detector 44 propagates a detection beam 48 that initially detects a downstream extremity 50 of the conveyed glass sheet. Thereafter as shown in FIG. 2b, the detector 44 detects an upstream extremity of the conveyed glass sheet such that the controller 36 can measure the spacing or distance between these upstream and downstream extremities and any difference either larger or smaller than the glass sheet of the predetermined size. Furthermore, the subsequent detection of the upstream extremity through the coordination of the controller 36 in driving the conveyor 20 provides an indiction of the location of the conveyed glass sheet so a control signal can be generated such that the glass sheet is moved to the central position below the forming face 34 of the forming mold 32 as shown by phantom line representation in FIGS. 3a and 3b. More specifically, each centrally positioned glass sheet G regardless of its spacing between its downstream and upstream extremities 50 and 52 will have the same distance downstream and upstream from the central location CL so that the forming of the glass sheet will be to the design shape despite any difference in the glass sheet sizes. It should be appreciated that other types of detectors can be used in addition to the beam propagating detector shown.

As illustrated in FIG. 1, the forming station 16 includes transfer apparatus collectively indicated by 54 for performing upward transfer of the glass sheet from the central position on the conveyor 20 upwardly to the central position on the forming mold 32 as shown in FIGS. 3a and 3b and described above. Just prior to the conveyed glass sheet G reaching the central position on the conveyor 20, the controller 36 shown in FIG. 1 slows the conveyor to decelerate the glass sheet. Upon reaching the central position shown in FIGS. 3a and 3b but before termination of the conveyance, the transfer apparatus 54 begins the upward transfer of the glass sheet to the forming face 34 of the forming mold 32 at the central position for the forming.

Figure 4:
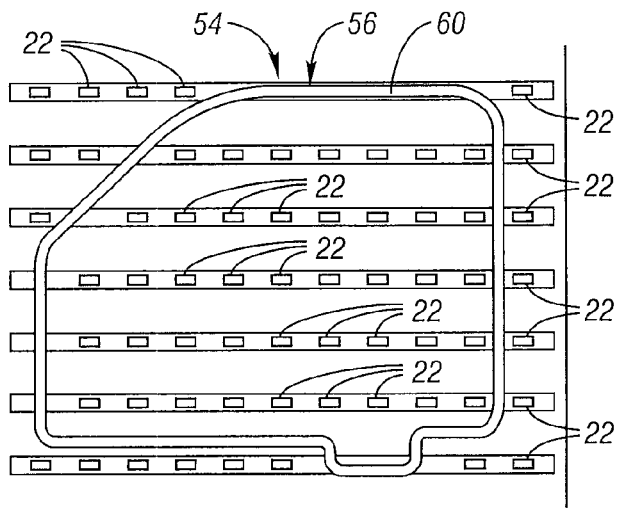
FIG. 4 is a top plan view taken along the direction of line 4-4 in FIG. 1 to illustrate transfer apparatus embodied as a lifter including a continuous ring.
Figure 5:
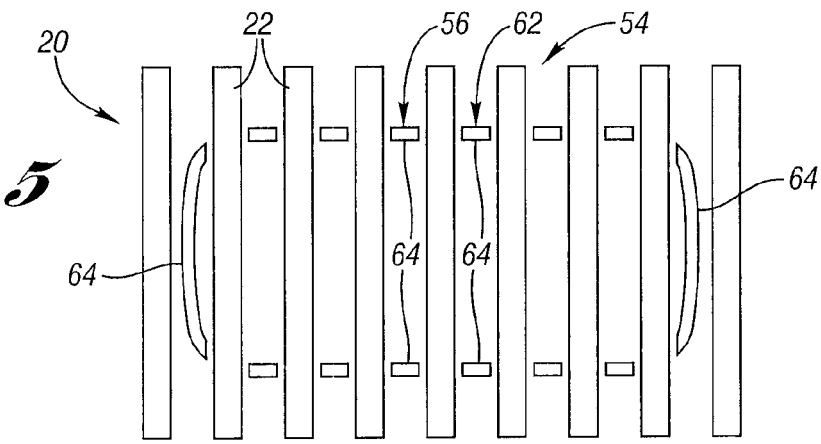
FIG. 5 is a view taken in the same direction as FIG. 4 illustrating another embodiment of the transfer apparatus lifter which is a segmented ring.

Transfer apparatus 54 as shown in FIG. 1 includes a lifter 56 that is moved vertically by an actuator 58 having a connection 60 to the controller 36. This lifter 56 as illustrated in FIG. 4 may be a continuous ring 60 that moves upwardly from below disc shaped wheel rolls 22 in a manner more fully disclosed by U.S. Pat. No. 6,543,255, the entire disclosure of which is hereby incorporated by reference. In addition as shown in FIG. 5, the lifter 56 may be embodied by a segmented ring 62 whose portion 64 move upwardly between elongated conveyor rolls 22 to provide the lifting.

With reference back to FIG. 1, the transfer apparatus 54 as disclosed also includes a vacuum supply 66 that draws a vacuum through a conduit 68 at openings in the forming face 34 of the forming mold 32 under the operation through a connection 70 to the controller 36. It should be noted that this vacuum supply 66 may have an initial greater vacuum that is provided by a vacuum impulse and subsequently is reduced to prevent deformation of the heated glass sheet at the forming face openings through which the vacuum is drawn. It is also possible to subsequently supply positive pressure air to the forming face openings to provide release of the glass sheet for delivery and subsequent cooling as is hereinafter more fully described.

The transfer apparatus 54 shown in FIG. 1 also includes a vertical control or actuator 72 having a connection 74 to the forming mold 32 to provide vertical movement thereof between the solid indicated upper position and the phantom line indicated lower position under the control of a connection 76 to the controller 36.

Figure 6:
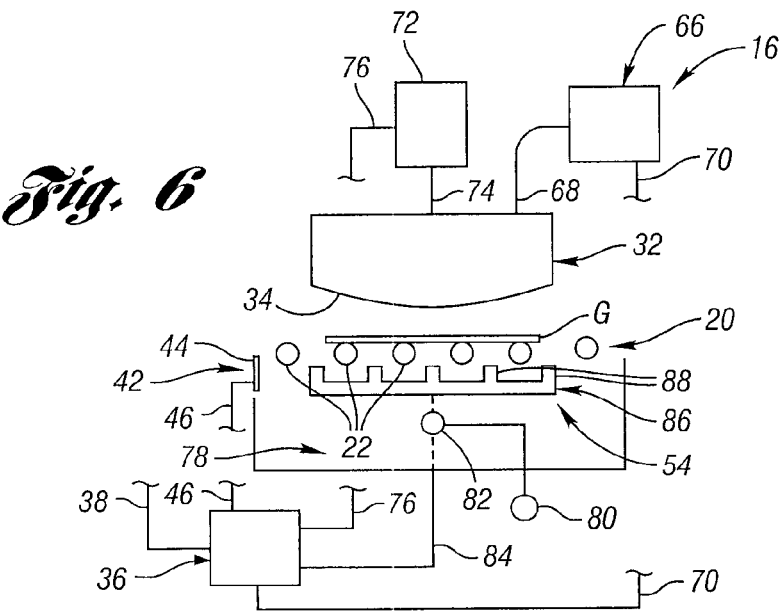
FIG. 6 is a partial side elevational view similar to FIG. 1 illustrating the system forming station wherein the transfer apparatus includes lift jets for blowing air upwardly from below the conveyor.

As shown in FIG. 6, the transfer apparatus 54 can also be constructed to include a gas supply 78 that feeds gas from a pressurized source 80 through a valve 82 operated by a connection 84 to the controller 36 to blow gas upwardly through an array 86 of lift jet nozzles 88. More specifically, the upwardly blown air passes between the conveyor rolls 22 to actuate the lifting.

The forming system 10 has particular utility when utilized to manufacture vehicle windshields which include outer and inner glass sheets that are of a slightly different size than each other. More specifically, the curved shape of the formed windshield results in the outer glass sheets being slightly larger than the inner glass sheets. However, since the glass sheets are centrally positioned along the direction of conveyance shown by arrow C with respect to the center location CL, both the inner and outer glass sheets are formed at the same forming portion of the forming face 34 of the forming mold 32 so as not to have different curvatures than each other. During the manufacturing, the larger outer glass sheets and the smaller inner glass sheets are alternately loaded on the conveyor 20 at the locating station 12 and ultimately heated in the furnace and processed for forming at the forming station 16 as described above.

After each glass sheet is formed as illustrated in FIG. 1, the cooling station 18 receives the formed glass sheet by a cooling mold 90 operated by delivery apparatus 92 having an actuator 94 from which a connection 96 extends to the mold and with a control connection 98 extending from the actuator to the controller 36 to provide the operation in coordination with the rest of the forming station.

It should be appreciated that the cooling station 18 can also be of the quenching station type for providing rapid cooling that tempers or heat strengthens the formed glass sheet in other applications.

While different modes of the invention have been illustrated and described, it is not intended that these modes illustrate and describe all possible forms of the invention. Rather, the words used in the specification are words of description rather than limitation, and it is understood that various changes may be made without departing from the spirit and scope of the invention.

What is claimed is:

1. A method for positioning a heated glass sheet for forming comprising:
   conveying a heated glass sheet on a horizontal conveyor in a horizontally plane of conveyance along a direction of conveyance toward a forming station having a forming mold including a downwardly facing curved forming face that is positioned above the plane of conveyance and has a forming portion for forming a glass sheet of a predetermined size;
   detecting the spacing along the direction of conveyance between downstream and upstream extremities of the conveyed glass sheet to determine any difference from the glass sheet of the predetermined size and generating a control signal indicating any such difference;
   continuing to convey the glass sheet below the forming mold and using the control signal to centrally position the glass sheet along the direction of conveyance below the forming portion of the forming face; and
   transferring the centrally positioned glass sheet from the conveyor to the forming mold for forming of the glass sheet against the forming face.

2. A method for heated glass sheet positioning as in claim 1 wherein the downstream extremity of the conveyed glass sheet is initially detected by a detector and the upstream extremity of the conveyed glass sheet is subsequently detected by the detector in coordination with the conveyance to generate the control signal, and the conveyance of the glass sheet being coordinated with the control signal to provide the central positioning of the glass sheet along the direction of conveyance below the forming portion of the forming face.

3. A method for heated glass sheet positioning as in claim 2 wherein the subsequent detection of the upstream extremity of the conveyed glass sheet generates the control signal which is coordinated with the conveyance to provide the central positioning of the glass sheet for the transfer from the conveyor to the mold forming face.

4. A method for heated glass sheet positioning as in claim 1 wherein the conveyance of the glass sheet is decelerated upon approaching the central position below the mold forming face and is transferred to the forming face at the central position while still moving.

5. A method for heated glass sheet positioning as in claim 1 wherein vehicle windshield outer and inner glass sheets are alternately conveyed and positioned for the forming with the outer glass sheets having a slightly greater distance between their downstream and upstream extremities than the inner glass sheets.

6. A method for heated glass sheet positioning as in claim 1 wherein the positioned glass sheet is transferred from the conveyor to the forming mold by a step selected from the group consisting of: lifting the glass sheet upwardly from the conveyor by a continuous ring; lifting the glass sheet upwardly from the conveyor by a segmented ring; drawing a vacuum at the curved forming face of the forming mold; moving the forming mold downwardly toward the conveyor; blowing gas upwardly from below the glass sheet to lift the glass sheet upwardly from the conveyor; and any combination of two or more of these steps.

7. A method for heated glass sheet positioning as in claim 1 wherein the glass sheet is laterally located prior to heating and subsequent conveyance to the forming station.

8. A method for cyclically positioning heated outer and inner glass sheets for forming in an alternating manner with the outer glass sheets having a larger size than the inner glass sheets, the method comprising:
   alternately loading the heated outer and inner glass sheets on a horizontal conveyor having a direction of conveyance;
   laterally positioning each glass sheet at a central location on the conveyor;
   conveying each laterally positioned glass sheet on the conveyor along the direction of conveyance toward a forming station having a forming mold including a downwardly facing curved forming face having a forming portion for forming both the larger outer glass sheets and the smaller inner glass sheets;
   initially detecting a downstream extremity of each conveyed glass sheet and subsequently detecting an upstream extremity of the conveyed glass sheet to determine the spacing along the direction of conveyance between the downstream and upstream extremities and generating a control signal responsive to the spacing;
   continuing to convey the glass sheet in coordination with the control signal and slowing the speed of glass sheet upon approaching a central position below the forming portion of the mold forming face; and
   transferring the glass sheet from the conveyor to the forming mold upon conveyance without stopping to the central position for forming of the glass sheet against the curved forming face with the transferring being provided by a step selected from the group consisting of: lifting the glass sheet upwardly from the conveyor by a continuous ring; lifting the glass sheet upwardly from the conveyor by a segmented ring; drawing a vacuum at the curved forming face of the forming mold; moving the forming mold downwardly toward the conveyor; blowing gas upwardly from below the glass sheet to lift the glass sheet upwardly from the conveyor; and any combination of two or more of these steps.

* * * * *

UNITED STATES PATENT AND TRADEMARK OFFICE
CERTIFICATE OF CORRECTION

| | |
|---|---|
| PATENT NO. | : 7,716,949 B2 |
| APPLICATION NO. | : 11/696209 |
| DATED | : May 18, 2010 |
| INVENTOR(S) | : Terry A. Bennett et al. |

It is certified that error appears in the above-identified patent and that said Letters Patent is hereby corrected as shown below:

Column 5, Line 37, Claim 1:

Delete "horizontally" and insert -- horizontal --.

Signed and Sealed this

Twenty-seventh Day of July, 2010

David J. Kappos
*Director of the United States Patent and Trademark Office*